(12) United States Patent
Noel-Baron et al.

(10) Patent No.: US 6,247,125 B1
(45) Date of Patent: Jun. 12, 2001

(54) PROCESSOR WITH SPECIALIZED HANDLING OF REPETITIVE OPERATIONS

(75) Inventors: Bertrand Noel-Baron, München (DE); Laurent Carre, Vorreppe (FR)

(73) Assignee: STMicroelectronics S.A., Gentilly (FR)

(*) Notice: Subject to any disclaimer, the term of this patent is extended or adjusted under 35 U.S.C. 154(b) by 0 days.

(21) Appl. No.: 09/181,795

(22) Filed: Oct. 28, 1998

(30) Foreign Application Priority Data

Oct. 31, 1997 (FR) .................................................. 97 13730

(51) Int. Cl.⁷ .............................. G06F 9/22; G06F 13/00; G06F 11/34
(52) U.S. Cl. .......................... 712/241; 712/241; 711/138; 714/30
(58) Field of Search ................................ 711/138; 712/7, 712/208, 241; 714/30; 379/280

(56) References Cited

U.S. PATENT DOCUMENTS

| | | | |
|---|---|---|---|
| 3,665,402 | 5/1972 | Greenspan et al. | 712/241 |
| 4,037,213 | 7/1977 | Atkins et al. | 712/212 |
| 4,126,896 | * 11/1978 | Yamazaki | 712/208 |
| 4,556,938 | * 12/1985 | Parker et al. | 712/241 |
| 5,257,359 | * 10/1993 | Blasco et al. | 711/138 |
| 6,058,465 | * 5/2000 | Nguyen | 712/7 |

FOREIGN PATENT DOCUMENTS

| | | |
|---|---|---|
| 0511484A2 | 11/1992 | (EP) . |
| 95-08897 | 1/1997 | (FR) . |
| 97/34224 | 9/1997 | (WO) . |

* cited by examiner

*Primary Examiner*—Daniel H. Pan
*Assistant Examiner*—Te Yu Chen
(74) *Attorney, Agent, or Firm*—Theodore E. Galanthay; Stephen C. Bongini; Fleit, Kain, Gibbons, Gutman & Bongini P.L.

(57) ABSTRACT

A processor that includes an instruction extraction stage, an instruction register, an instruction decoder, a first multiplexer that supplies the instruction register, and an autonomous counter with a presetting register. The first multiplexer receives the output of the extraction stage and the output of the instruction register, and the instruction decoder receives the output of the instruction register. Additionally, a first circuit produces a repetition signal if a received instruction is a repetition instruction, and a second circuit outputs a value from the received instruction to the presetting register when the received instruction is a repetition instruction. A third circuit produces an instruction execution signal that is supplied to the counter, and the first multiplexer is controlled so as to supply the instruction register based on a control output of the counter. The present invention also provides a method of handling instructions to be repeated by a processor.

13 Claims, 2 Drawing Sheets

PROCESSOR WITH SPECIALIZED HANDLING OF REPETITIVE OPERATIONS

CROSS-REFERENCE TO RELATED APPLICATIONS

This application is based upon and claims priority from prior French Patent Application No. 97-13730, filed Oct. 31, 1997, the entire disclosure of which is herein incorporated by reference.

BACKGROUND OF THE INVENTION

1. Field of the Invention

The present invention relates to processors, and more specifically to processors that increase performance through the specialized handling of repetitive operations.

2. Description of the Related Art

In applications such as signal transmission applications, the quality of a transmission signal can deteriorate to the extent that the information received at the output of the channel is of doubtful quality. In a typical system, the transmitted information signal is temporally convoluted in a conventional manner, with the convoluted mode including forbidden states or conformations for the received signals. Therefore, in reception it is sufficient for the received information elements (generally a pair of bits) to compute a set of information elements to be sent. These information elements, when convoluted with respect to one another, are likely to have had the received information as the result. The information elements are convoluted with the previous, and previously received, information elements. It is possible, for these previous information elements, to perform the same analysis. Thus, it is possible to go back in time in correspondence with the information elements previously received. Further, any forbidden states arrived at by the operations for going back in time could not have actually been sent, so these states must be eliminated.

For simplicity, it can be assumed that for a pair of bits received it is necessary on 256 previous occurrences to compute the meaning of the pair of bits transmitted at the beginning of these 256 occurrences. In other words, at each pair of bits received, the 256 previous occurrences are taken into account. To achieve the bit rates typically desired (e.g., one megabit per second in speech processing), the signal processor must be capable of performing up to 256 processing operations in less than one microsecond. Further, the elementary operations that must be performed for the processing operations include multiplication accumulation ("MAC") operations. For example, for each of the 256 processing operations described above, the computation of 8 or 16 elementary MAC operations can be required.

In conventional processors, repetitive operations (i.e., the 8 or 16 elementary operations) are performed by having the processor load a counter register with the value 8 or 16 at the beginning of the series. Then, the processor launches one iteration of the MAC function, decrements the counter by one, and compares the counter value with a reference value. As long as the two values are not equal, the processor repeats this process (i.e., performs another iteration). When the macro-operation MAC is completed, the processor can proceed to the next processing operation of the 256 processing operations to be performed. Because for each elementary operation the processor must generate commands to load the counter register, decrement it, and compare it with a reference value, the processor must be very fast to allow processing to be completed within the required time.

To overcome this drawback, it has been proposed to install coprocessors or multicycle instructions. However, the designing of a coprocessor and the designing of a multicycle instruction have the drawback of requiring prior knowledge of the nature of the instruction to be performed. For example, for the processing operations described above, a coprocessor would be designed to perform the predetermined 16 MAC steps. Therefore, if it later becomes desirable to be able perform 24 such steps, the coprocessor must be changed. With respect to multicycle instructions, a sequencer or state machine similarly defines the executable operations (and it may even replace the processor for certain simple instructions). Because the sequencer is permanently fixed, the set of executable instructions cannot be extended by the addition of new repeatable instructions.

SUMMARY OF THE INVENTION

In view of these drawbacks, it is an object of the present invention to remove the above-mentioned drawbacks and to provide a processor that performs at an increased speed. During the performance of instructions to be executed several times, the instruction register of the processor is looped back to itself to reload the same instruction until reiterated performance of the instruction is to be ended. More specifically, when a repeatable instruction is loaded into the instruction register, the instruction is recognized as such in a decoding step of the processor. This causes a reference value contained in the instruction to be loaded into a counter and a counting automaton to be activated to operate the process at each new cycle. According to this mechanism, the instruction register is reloaded with the same instruction until the counter reaches the reference value. Thus, the automaton counting and reloading mechanism allows the desired instruction repetition without requiring constant intervention by the processor. This allows the processor to operate with greater speed.

Another object of the present invention is to provide a processor in which less modification is required to add additional instructions.

A further object of the present invention is to provide a processor in which a repetition sequence can be interrupted whenever a multicycle instruction mechanism authorizes the interruption.

One embodiment of the present invention provides a processor that includes an instruction extraction stage, an instruction register, an instruction decoder, a first multiplexer that supplies the instruction register, and an autonomous counter with a presetting register. The first multiplexer receives the output of the extraction stage and the output of the instruction register, and the instruction decoder receives the output of the instruction register. Additionally, a first circuit determines whether a received instruction is a repetition instruction and produces a repetition signal in accordance with its determination, and a second circuit that outputs a value from the received instruction to the presetting register when the received instruction is a repetition instruction. Further, a third circuit produces an instruction execution signal that is supplied to the counter, and the first multiplexer is controlled so as to supply the instruction register based on a control output of the counter. In a preferred embodiment, a control circuit controls the first multiplexer in accordance with the control output of the counter. The present invention also provides a method of handling instructions to be repeated by a processor.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings. In the following description, the term "reiteration" is used to refer to the conventional successive iteration technique, and the term "repetition" is used to refer to the instruction repetition technique of the present invention. In other words, instruction "reiteration" must be managed by the processor (e.g., by operating cycles of the decoder itself) while instruction "repetition" is performed autonomously (i.e., loading, execution, and decrementation or incrementation of the counter are performed in a single cycle).

Figure 1:
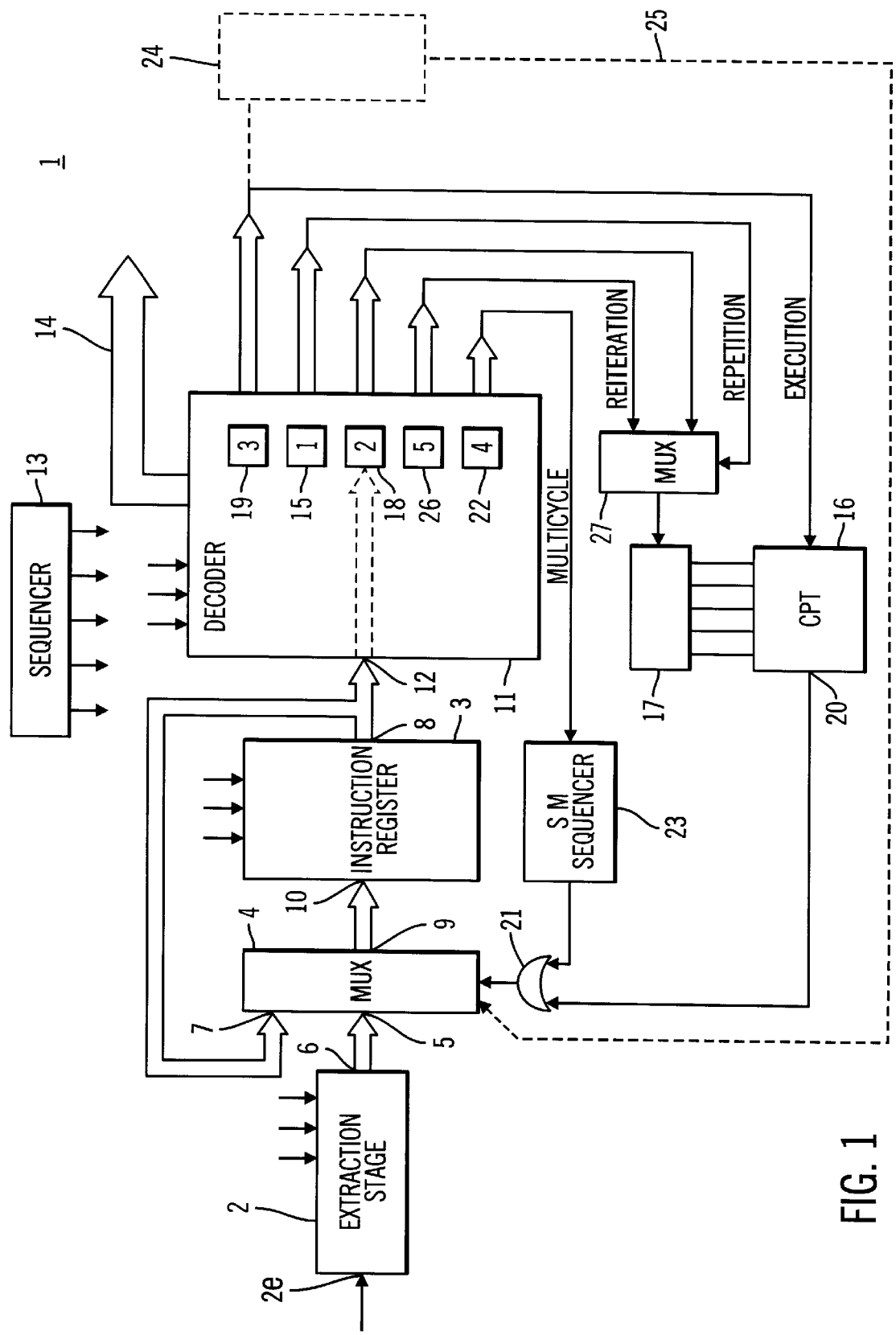
FIG. 1 is a block diagram of a processor according to a preferred embodiment of the present invention.

FIG. 1 is a block diagram showing a processor according to a preferred embodiment of the present invention. The processor 1 includes an instruction extraction stage 2 whose input 2e is connected to an instruction memory (not shown). A first multiplexer 4 has one input 5 connected to the output 6 of the extraction stage 2, and the output 9 of the first multiplexer 4 is supplied to the input 10 of an instruction register 3. The output 8 of the instruction register 3 is fed back to the other input 7 of the first multiplexer 4 and to the input 12 of a decoder 11. The extraction stage 2, instruction register 3, and decoder 11 are controlled by a sequencer 13 in a conventional manner. The decoder 11 generates signals corresponding to the processing it carries out on a bus 14, which for simplicity of description is shown as an address, data, and control bus. Additionally, the decoder 11 receives other signals that are not shown in FIG. 1 such as data from data memories (not shown).

The decoder 11 of the preferred embodiment includes a first circuit 15 to decode whether an instruction is an instruction to be repeated and to produce a repetition signal in accordance with the result of such decoding. A second circuit 18 within the decoder 11 loads a presetting register 17 of a counter 16 of the processor with a value that is contained in an instruction to be repeated. A third circuit 19 within the decoder 11 produces an elementary execution signal for the instruction and supplies the signal to the counter 16. In further embodiments, the execution signal is a cycle signal produced by the sequencer 13.

Figure 2:
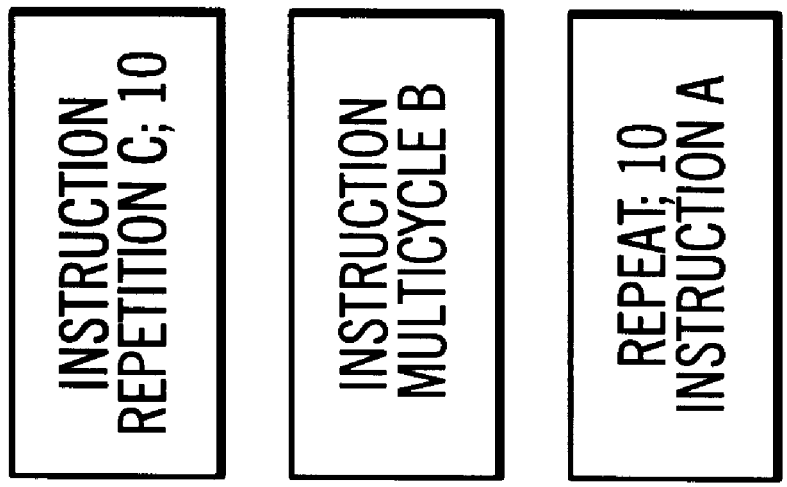
FIG. 2 is a block diagram of different types of instructions that can be executed by the processor of FIG. 1.

The operation of the processor of FIG. 1 will now be explained. An instruction that is to be repeated (e.g., the instruction "INSTRUCTION REPETITION C; 10" of FIG. 2) is loaded into the instruction register 3. The first circuit 15 of the decoder 11 detects a specific conformation of the instruction bits for instruction C that signifies the repeatable character of the instruction and generates an active repetition signal to indicate such an instruction. (In FIG. 2, the repeatable character of the instruction C is indicated by the word REPETITION in the instruction code itself) In other words, the first circuit 15 can decode the presence of the word REPETITION in the instruction code or a conformation of the instruction bits that corresponds to such an instruction code.

The repetition signal, which validates the working of the counter 16, will remain in the active state until the instruction to be repeated has completely performed all its repetitions. The second circuit 18 of the decoder resolves the numerical argument in the instruction to be repeated (e.g., the value 10 in instruction C of FIG. 2), and after the zero-setting of the counter 16, supplies this number to the presetting register 17 of the counter. While in the preferred embodiment the second circuit merely loads (in binary form) the exact value from the instruction bits for instruction C, in further embodiments the second circuit performs an actual decoding operation to arrive at the proper number of repetitions.

For each cycle of the processor (whose rate is set by the commands of the sequencer), a third circuit 19 of the decoder 11 or the sequencer 13 itself observes the performance of one repetition of the instruction C and sends a corresponding execution signal to the counter 16. In response to this signal, the value of the counter 16 is incremented by one. When the counter value reaches the value stored in the presetting register 17, an output 20 of the counter generates a control signal that is supplied to a control circuit 21. Significantly, the operation of the counter 16 is autonomous and independent of the operation of the sequencer 13. For such operation, the counter only requires conventional comparison and zero-setting circuits.

The control circuit 21 controls the first multiplexer 4 such that whenever the output of the control circuit 21 is active the first multiplexer 4 maintains the instruction in the instruction register 3. In other words, the first multiplexer 4 feeds the output of the instruction register back to the input of the instruction register. Conversely, when the counter value reaches the preset value and the counter generates the control signal, the control circuit 21 causes the first multiplexer 4 to switch over so that a new instruction is loaded into the instruction register 3 from the instruction extraction stage 2. In this manner, the autonomous counter operation controls the repetition of an instruction that is to be repeated.

Further, in the preferred embodiment, the processor 1 is also capable of performing multicycle instructions in a conventional manner. Therefore, in the processor of FIG. 1, a fourth circuit 22 of the decoder 11 decodes a multicycle instruction (e.g., the instruction "INSTRUCTION MULTICYCLE B" of FIG. 2) and generates a multicycle signal to indicate such an instruction. The multicycle signal is supplied to a conventional multicycle state machine 23 that delivers a holding signal to the first multiplexer 4 through the control circuit 21. In particular, the holding signal from the state machine 23 is combined with the control signal from the counter 16 by OR gate 21 in order to cause the first multiplexer 4 to maintain the instruction in the instruction register 3. As at the completion of the proper number of executions of a repetitive instruction, the state machine 23 causes the first multiplexer 4 to switch over at the completion of the multicycle instruction in order to transfer a new instruction from the extraction stage 2.

Similarly, in the preferred embodiment, the processor 1 is also capable of performing conventional reiteration instructions in a conventional manner. (The difference between a "reiteration" instruction and a "repetition" instruction is explained above.) A reiteration instruction is a composite instruction (e.g., the grouped instructions "REPEAT; 10" and "INSTRUCTION A" of FIG. 2) including a first instruction (REPEAT; 10) and a second instruction (INSTRUCTION A) that is to be reiterated. Thus, the extraction stage 2 of the processor first extracts the first instruction and then extracts the second instruction.

In one embodiment, the first instruction causes the parameter-setting value (e.g., 10) in the instruction to be loaded into a register 24 in the conventional manner. Then, the sequencer 13 prompts the loading of the second instruction A, which is to be reiterated, into the instruction register 3. The sequencer then successively prompts the performance of the second instruction A, the decrementation of the register 24, the comparison of the register value with zero, and the reiteration of the instruction. In particular, the sequencer prompts the reiteration by dispatching a command to the multiplexer as shown by a dashed link 25 in FIG. 1.

However, in the preferred embodiment, instruction reiteration is enabled by a fifth circuit 26 within the decoder 11. The fifth circuit 26 resolves the number of times that the instruction following the REPEAT instruction is to be executed and loads this value into the presetting register 17. A second multiplexer 27, which receives the output of the second circuit 18 and the fifth circuit 26, is controlled by the repetition signal from the first circuit 15. Thus, the repetition signal indicates whether the instruction to be executed several times is a repetition instruction or a reiteration instruction. The second multiplexer 27 is required because for a reiteration instruction, the next instruction from the instruction extraction stage 2 must be executed the requested number of times (and not the presently loaded REPEAT instruction).

Accordingly, the present invention provides a faster processor having a simplified sequencer. The work performed by the processor's decoder is accelerated because the decoder does not have to carry out either the decrementation of a counter register or the comparison of the counter register value with a reference value. Although an additional repetition instruction decoding circuit is required in the decoder, the advantages of the present invention are achieved through the reloading and counting automaton by reducing the demands on the sequencer. The added decoding circuit is required to detect the repeatable character of the instruction from the conformation of the instruction bits. Further, because the number of conformations of these bits is limited, only a limited number of instructions can be made repeatable. Thus, to allow other instructions to be executed several times, the preferred embodiment also allows the conventional reiteration instruction pair.

The processor of the present invention is particularly suited for signal processing, especially for use in a channel decoder that implements VITERBI algorithms because of its ability to process a very large number of bits at greater speed.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A processor comprising:
   an instruction extraction stage capable of receiving information from an instruction memory;
   an instruction register;
   a first multiplexer receiving at one input an output of the extraction stage and at another input an output of the instruction register, an output of the first multiplexer being supplied to the instruction register;
   an instruction decoder receiving the output of the instruction register;
   a first circuit in the instruction decoder that determines whether a received instruction is a repetition instruction, the first circuit producing a repetition signal in accordance with its determination;
   an autonomous counter with a presetting register;
   a second circuit that, at least when the received instruction is a repetition instruction, outputs a value contained in the received instruction to the presetting register of the counter; and
   a third circuit producing an instruction execution signal that is supplied to the counter,
   wherein the first multiplexer is controlled based on a control output of the counter.

2. The processor as defined in claim 1, wherein the instruction decoder also includes a fourth circuit that determines whether a received instruction is a multicycle instruction, the fourth circuit producing a multicycle signal in accordance with its determination.

3. The processor as defined in claim 2, further comprising a sequencer that receives the multicycle signal from the fourth circuit and generates a holding signal in response to the multicycle signal.

4. The processor as defined in claim 3, further comprising an OR gate that receives the control output of the counter and the holding signal of the sequencer, the OR gate generating a control signal that controls the first multiplexer.

5. The processor as defined in claim 4, further comprising:
   a fifth circuit in the decoder that determines whether a received instruction is a reiteration instruction, wherein when the received instruction is a reiteration instruction, the fifth circuit outputs a value contained in the received instruction; and
   a second multiplexer receiving at one input the output of the second circuit and at another input the output of the fifth circuit, the second multiplexer being controlled by the repetition signal from the first circuit.

6. The processor as defined in claim 1, further comprising a control circuit that controls the first multiplexer in accordance with the control output of the counter.

7. The processor as defined in claim 1, further comprising:
   a fifth circuit in the decoder that determines whether a received instruction is a reiteration instruction,
   wherein when the received instruction is a reiteration instruction, the fifth circuit outputs a value contained in the received instruction to the presetting register of the counter.

8. The processor as defined in claim 7, further comprising a second multiplexer receiving at one input the output of the second circuit and at another input the output of the fifth circuit, the second multiplexer being controlled by the repetition signal from the first circuit.

9. A processor comprising:
   an instruction extraction stage;
   an instruction register coupled to the instruction execution stage;

a first multiplexer receiving at one input an instruction output from the extraction stage and at another input an instruction output from the instruction register, an output of the first multiplexer being supplied to the instruction register so as to selectively feed the instruction output from the instruction register back into the instruction register;

an instruction decoder receiving the output of the instruction register;

an autonomous counter with a presetting register;

a repetition control circuit in the instruction decoder that determines whether a received instruction is a repetition instruction, wherein when the received instruction is a repetition instruction, the repetition control circuit loads a value contained in the received instruction into the presetting register of the counter; and an execution circuit producing an instruction execution signal that is supplied to the counter, wherein the first multiplexer is controlled by a control output of the counter.

10. The processor as defined in claim 9, further comprising a control circuit that controls the first multiplexer in accordance with the control output of the counter.

11. A method of handling instructions to be repeated by a processor, said method comprising the steps of:

loading an instruction register with an instruction;

decoding the loaded instruction to determine if it is a repetition instruction; and if the loaded instruction is a repetition instruction:
  loading an autonomous counter with a number of times the loaded instruction is to be repeated, the number being contained in the loaded instruction;
  activating a counting automaton, the automaton decrementing the counter each time an instruction is executed and comparing the value of the counter with a reference value; and
  feeding the loaded instruction back to the instruction register as the next instruction as long as the value of the counter is not equal to the reference value.

12. The method as defined in claim 11, further comprising the step of loading a new instruction into the instruction register when the value of the counter equals the reference value.

13. The method as defined in claim 12, further comprising the step of loading a new instruction into the instruction register after executing the loaded instruction if the loaded instruction is not a repetition instruction.

\* \* \* \* \*